United States Patent
Reyes

(10) Patent No.: US 9,386,416 B1
(45) Date of Patent: Jul. 5, 2016

(54) MOBILE CUSTOMER PRESENCE DETECTION

(71) Applicant: MicroStrategy Incorporated, Vienna, VA (US)

(72) Inventor: Benjamin Reyes, Fairfax, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 14/274,515

(22) Filed: May 9, 2014

Related U.S. Application Data

(60) Provisional application No. 61/932,928, filed on Jan. 29, 2014.

(51) Int. Cl.
*H04W 24/00* (2009.01)
*H04M 11/04* (2006.01)
*H04W 4/02* (2009.01)

(52) U.S. Cl.
CPC ................................. *H04W 4/021* (2013.01)

(58) Field of Classification Search
CPC .............................. H04L 67/18; H04W 4/021
USPC ....................................................... 455/457
See application file for complete search history.

(56) References Cited

U.S. PATENT DOCUMENTS

| | | | | |
|---|---|---|---|---|
| 2009/0082139 A1* | 3/2009 | Hart | ................... | A63B 24/0003 473/407 |
| 2013/0217332 A1* | 8/2013 | Altman | .................. | H04H 60/90 455/41.2 |
| 2013/0282438 A1* | 10/2013 | Hunter | ..................... | G01S 1/02 705/7.32 |
| 2013/0297422 A1* | 11/2013 | Hunter | ............... | G06Q 30/0261 705/14.58 |
| 2014/0155094 A1* | 6/2014 | Zises | ..................... | H04W 4/206 455/456.3 |
| 2014/0358727 A1* | 12/2014 | Shannon et al. | .......... | 705/26.41 |

* cited by examiner

*Primary Examiner* — Thomas Lett
(74) *Attorney, Agent, or Firm* — Fish & Richardson P.C.

(57) ABSTRACT

A computer-implemented method, including detecting, by a first client device, a presence of a mobile customer in a particular geographic location, with detecting being through a direct device communication between the first client device and a second client device that is associated with the mobile customer; in response to the mobile customer presence detection, updating a local registry of the first client device with a customer identifier of the mobile customer; and retrieving, from a server device, customer information about the mobile customer; generating, based on contents of the local registry, a list of customers who are presently located in the particular geographic location; and rendering on a display device of the first client device at least one of the list of customers or the retrieved customer information.

20 Claims, 11 Drawing Sheets

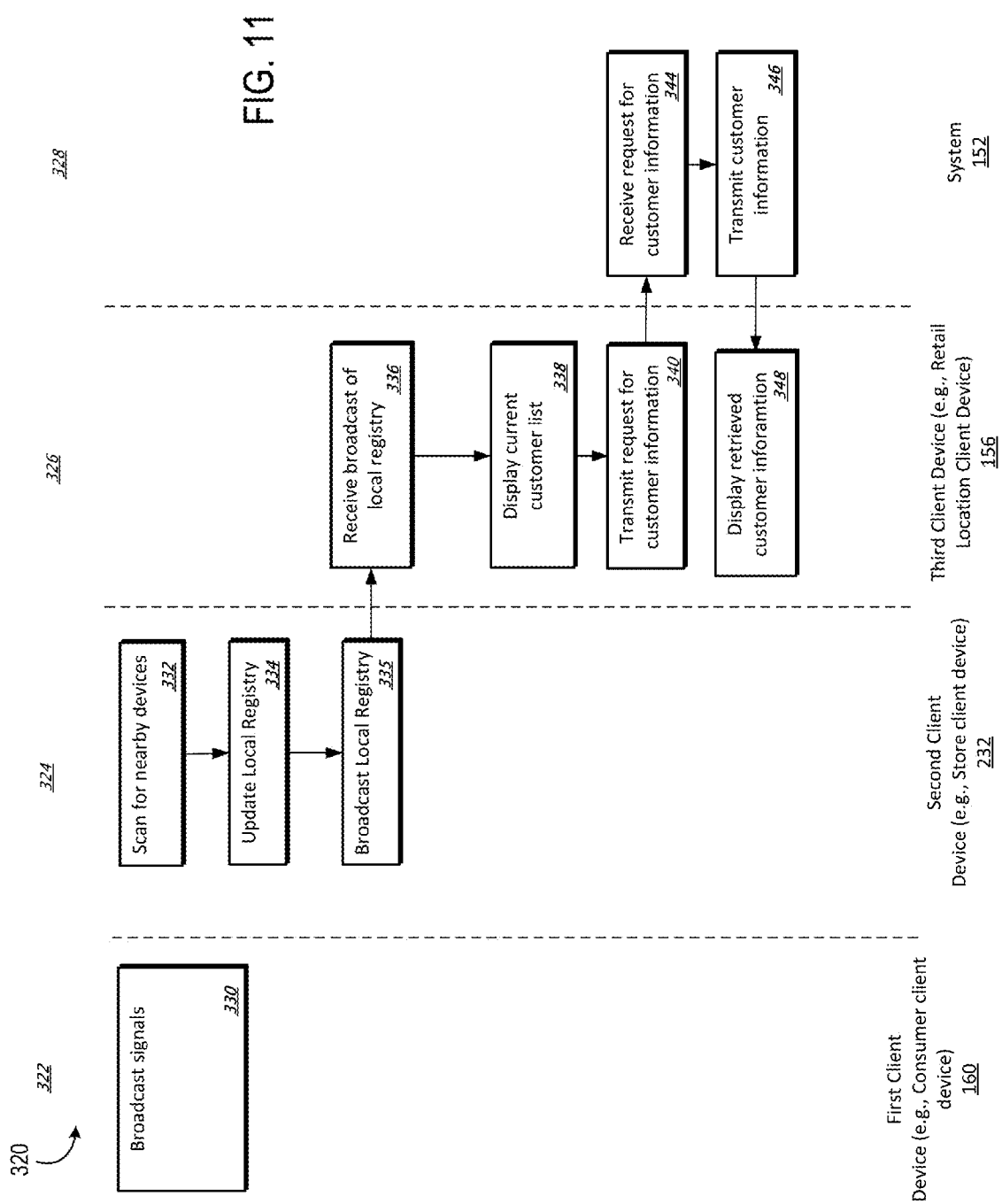

MOBILE CUSTOMER PRESENCE DETECTION

CLAIM OF PRIORITY

This application claims priority under 35 U.S.C. §119(e) to provisional U.S. Patent Application 61/932,928, filed on Jan. 29, 2014, the entire contents of which are hereby incorporated by reference.

BACKGROUND

Geo-fencing is a feature in a software program that uses the global positioning system (GPS) or radio frequency identification (RFID) to define geographical boundaries. A geo-fence is a virtual barrier. Programs that incorporate geo-fencing allow an administrator to set up triggers so when a device enters (or exits) the boundaries defined by the administrator, a text message or email alert is sent. In an example, Bluetooth Low Energy (BLE) beacons are a mechanism that define geo-fences.

SUMMARY

In an implementation, a computer-implemented method includes detecting, by a first client device, a presence of a mobile customer in a particular geographic location, with detecting being through a direct device communication between the first client device and a second client device that is associated with the mobile customer; in response to the mobile customer presence detection, updating a local registry of the first client device with a customer identifier of the mobile customer; and retrieving, from a server device, customer information about the mobile customer; generating, based on contents of the local registry, a list of customers who are presently located in the particular geographic location; and rendering on a display device of the first client device at least one of the list of customers or the retrieved customer information. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In some implementations, the actions include receiving, through the direct device communication by a first version of an application that is executing on the first client device, a request to locally register the mobile customer in the local registry of the first client device as being presently located in a particular geographic location, wherein the first client device is located in the same geographic location, wherein the request is received from the second client device that is executing a second version of the application, and wherein the request comprises a customer identifier that uniquely identifies the mobile customer. In other implementations, the application is an application for promoting transactions with a particular retailer; wherein the first version of the application is a retail sales associate version of the application; wherein the second version of the application is a customer version of the application; wherein the particular geographic location comprises a retail store; wherein the first client device comprises a client device that is used by a retail sales associate; and wherein the second client device comprises a client device that is used by the consumer. The actions include generating information for a graphical user interface that when rendered on the first client device through the first version of the application displays: the list of customers who are presently located in the particular geographic location.

The actions include rendering, on a display device of the first client device, the list of customers who are presently located in the particular geographic location; receiving information indicative of a selection of one of the customers in the list; retrieving, from a server device, customer information about the selected customer; and in response to the selection, displaying the retrieved customer information about the selected customer.

In other implementations, a computer-implemented method includes detecting, by a first version of an application that is executing on a first client device, a presence of a mobile customer in a particular geographic location, with detecting being through a direct device communication between the first client device and a second client device that is associated with the mobile customer, and with the second client device executing a second version of the application; in response to the mobile customer presence detection, updating a local registry of the first client device with a customer identifier of the mobile customer; and broadcasting to one or more third client devices in the particular geographic location the updated local registry to cause a third version of the application that is executing on the one or more third client devices to be updated with a list of customers who are presently in the particular geographic location. Other embodiments of this aspect include corresponding computer systems, apparatus, and computer programs recorded on one or more computer storage devices, each configured to perform the actions of the methods.

In some embodiments, the first version of the application is a store-side application that is dedicated to scanning for nearby devices that execute the second version of the application; wherein the second version of the application is a consumer version of the application; wherein the third version of the application is a store associate version of the application. The actions include retrieving, from a server device, customer information about the detected mobile customer; and transmitting to at least one of the one or more third client devices the retrieved customer information for display on the at least one of the one or more third client devices.

All or part of the foregoing may be implemented as a computer program product including instructions that are stored on one or more non-transitory machine-readable storage media and/or one or more computer-readable hardware storage devices that are a hard drive, a random access memory storage device, such as a dynamic random access memory, machine-readable hardware storage devices, and other types of non-transitory machine-readable storage devices, and that are executable on one or more processing devices. All or part of the foregoing may be implemented as an apparatus, method, or electronic system that may include one or more processing devices and memory to store executable instructions to implement the stated functions.

The details of one or more embodiments are set forth in the accompanying drawings and the description below. Other features, objects, and advantages of the techniques described herein will be apparent from the description and drawings, and from the claims.

DESCRIPTION OF DRAWINGS

FIGS. 10 and 11 are flow charts of processes for performing mobile customer presence detection.

DETAILED DESCRIPTION

Figure 1:
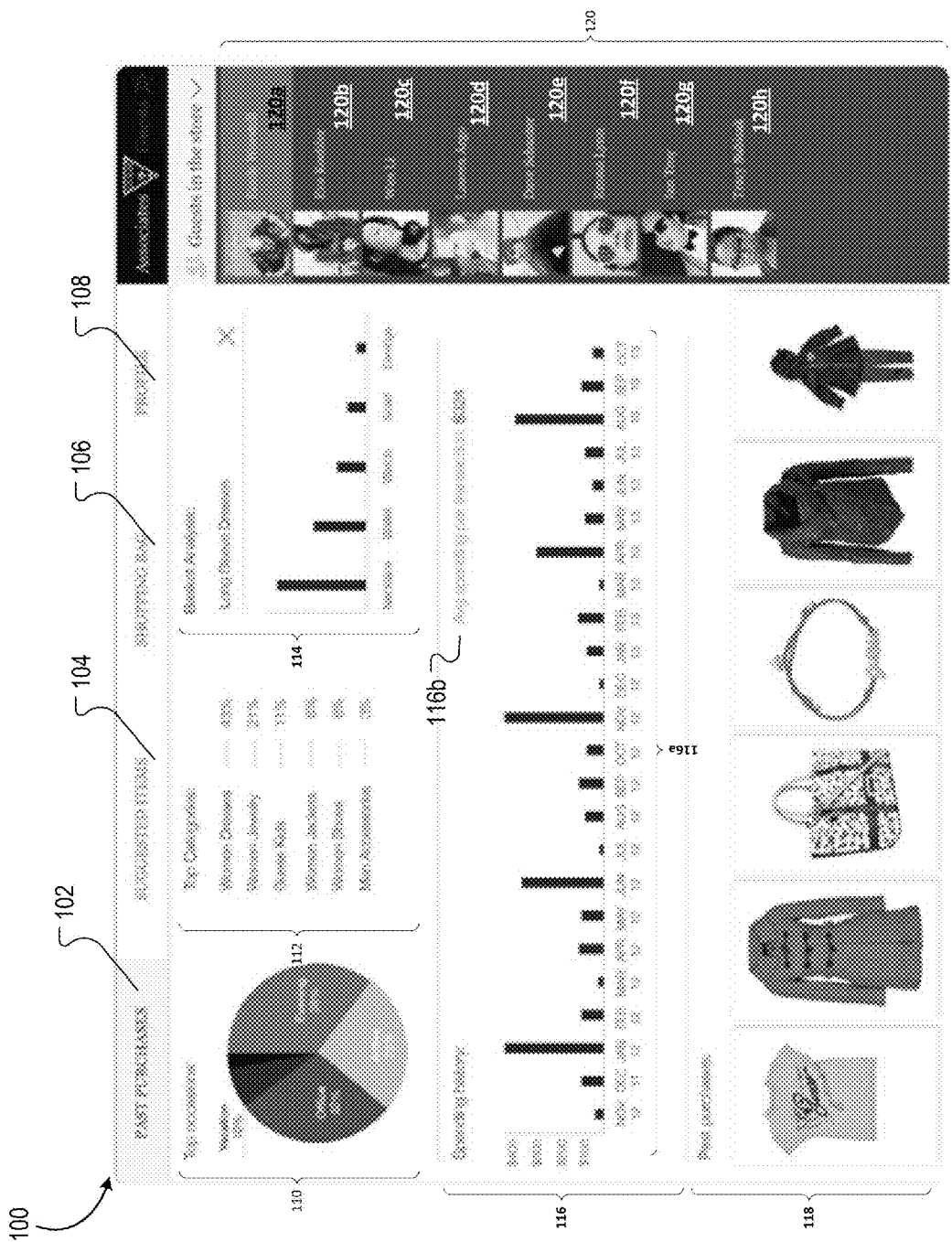
FIG. 1 is a diagram of a graphical user interface that is generated by a system for mobile customer presence detection.

Referring to FIG. 1, graphical user interface 100 displays a customer report, e.g., to a sales associate in a retail store. In an example, the sales associate is in the retail store with a computing device (e.g., an iPad or a smart phone) and moves around the retail store, while viewing the customer report on the computing device.

In the example, graphical user interface 100 includes currently present customer portion 120 that displays information indicative of customers who are presently in a particular geographic location, e.g., the retail store. Currently present customer portion 120 displays customer information 120a-120h, with each item of customer information representing a customer who is present in the retail store. Each of customer information 120a-120h is selectable, with selection of an item of customer information causing graphical user interface 100 to display information pertaining to the selected customer (e.g., customer). In the example of FIG. 1, a viewer of graphical user interface 100 has selected to view information associated with the customer represented by customer information 120a.

Graphical user interface 100 includes past purchases link 102, selection of which causes graphical user interface 100 to display information indicative of past purchases of the customer that is selected via currently present customer portion 120. Graphical user interface 100 also includes suggested items link 104, selection of which causes graphical user interface 100 to display information indicative of suggested items that a particular customer (e.g., the customer selected in currently present customer portion 120) may be interested in and want to purchase. The suggested items are based on the customer's past purchases. Graphical user interface 100 includes shopping bag link 106, selection of which causes graphical user interface 100 to display items that a particular customer wishes to purchase. Graphical user interface 100 includes profile link 108, selection of which causes graphical user interface 100 to be updated to display a customer profile of a particular customer (e.g., the customer selected via currently present customer portion 120).

Graphical user interface 100 includes top occasions portion 110 that displays information (e.g., a graph) indicative of the top occasions for which a particular customer (e.g., customer 120a) has purchased merchandise. In this example, top occasions portion 110 is generated by tracking past purchases of the customer and then categorizing the types of purchase (e.g., based on various occasions). In another example, top occasions portion 110 displays information indicative of the top occasions for a group of customers, e.g., rather than displaying the top occasions for a particular customer.

Graphical user interface 100 also displays top categories information 112, e.g., information specifying top categories of goods that have been purchased by a particular customer and/or by a group of customers at a retail store. Generally, a top category includes a category of goods that have been purchased with increased frequency, relative to frequencies at which other categories of goods are purchased. Graphical user interface 100 also includes basket analysis portion 114—for display of information indicative of types of goods that are currently in an electronic shopping cart of a customer.

Graphical user interface 100 also includes spending history portion 116 to display information indicative of how much money a particular customer (e.g., the customer selected in portion 120) has spent with the retailer over a period of time. Spending history portion 116 includes timeline 116a, e.g., a representation of the period of time over which spending is tracked. Spending history portion 116 also includes information 116b that specifies an average amount of money a particular customer has spent with the retailer over a period of time. Graphical user interface 100 also includes portion 118 for display of information indicative of past purchases and/or transactions of a particular customer.

Figure 2:
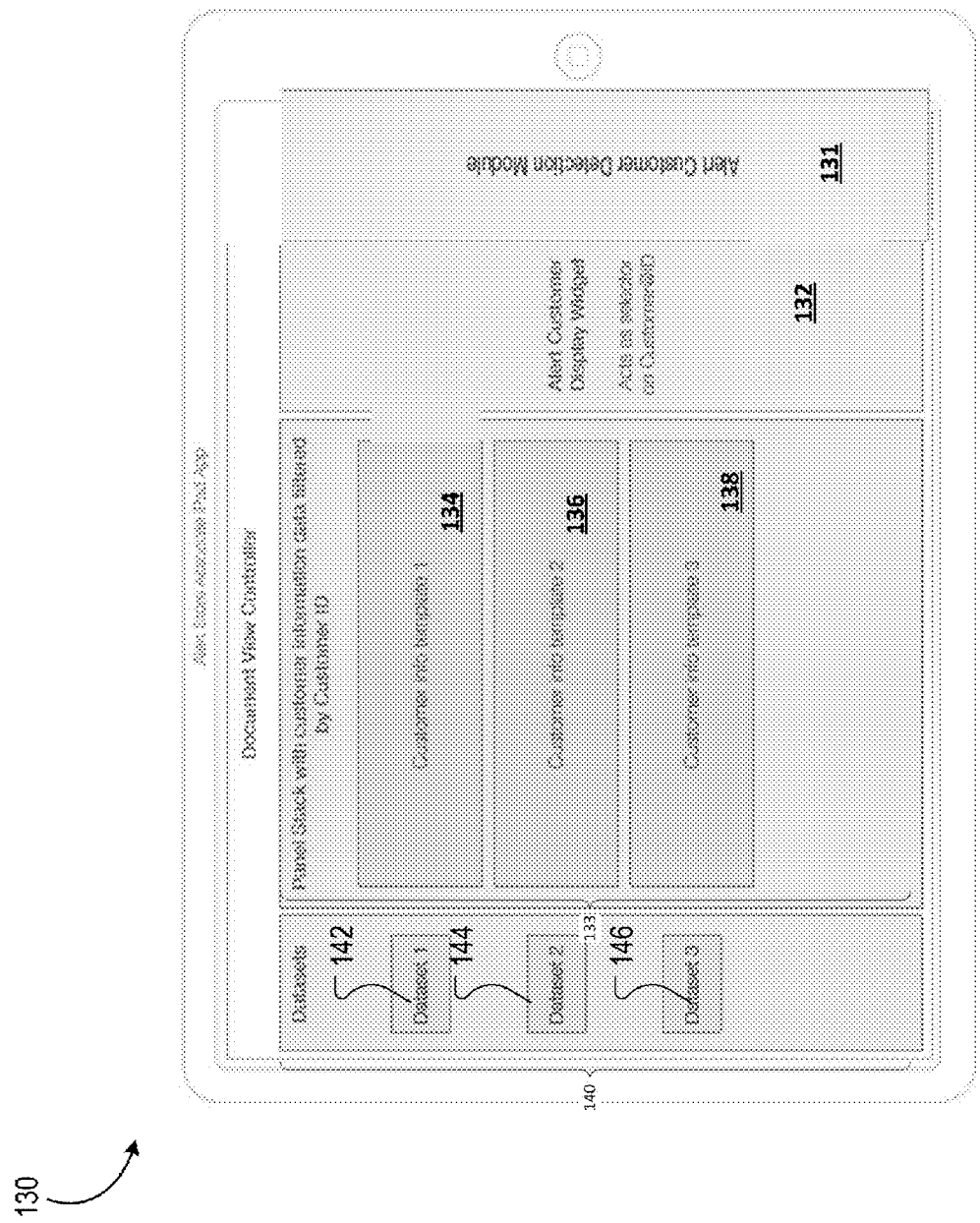
FIG. 2 is a diagram of a template for displaying mobile customer presence detection information.

Referring to FIG. 2, block diagram 130 depicts the different components that are included in the client side version of the application, e.g., that is displayed to a sales associate in the retail store. For example, block diagram 130 includes portion 132 to specify that a customer report includes a listing of customers who are presently located in a particular geographic location, e.g., a retail store. For example, portion 132 includes a customer display widget, which is the component that displays, graphically, the local registry of customers detected in the store. Diagram 130 also includes portion 133 with customer information templates 134, 136,138 that represent the visualizations or grids that show the actual customer data in readable way. Diagram 130 includes portion 131 that depicts the actual component that does the customer detection by means of detecting Bluetooth signals or other direct device to device communications and it also represents the local registry. Block diagram 130 also includes dataset portion 140 $f$ with datasets 142, 144, 146 that represent the data that sources the customer data.

Figure 3:
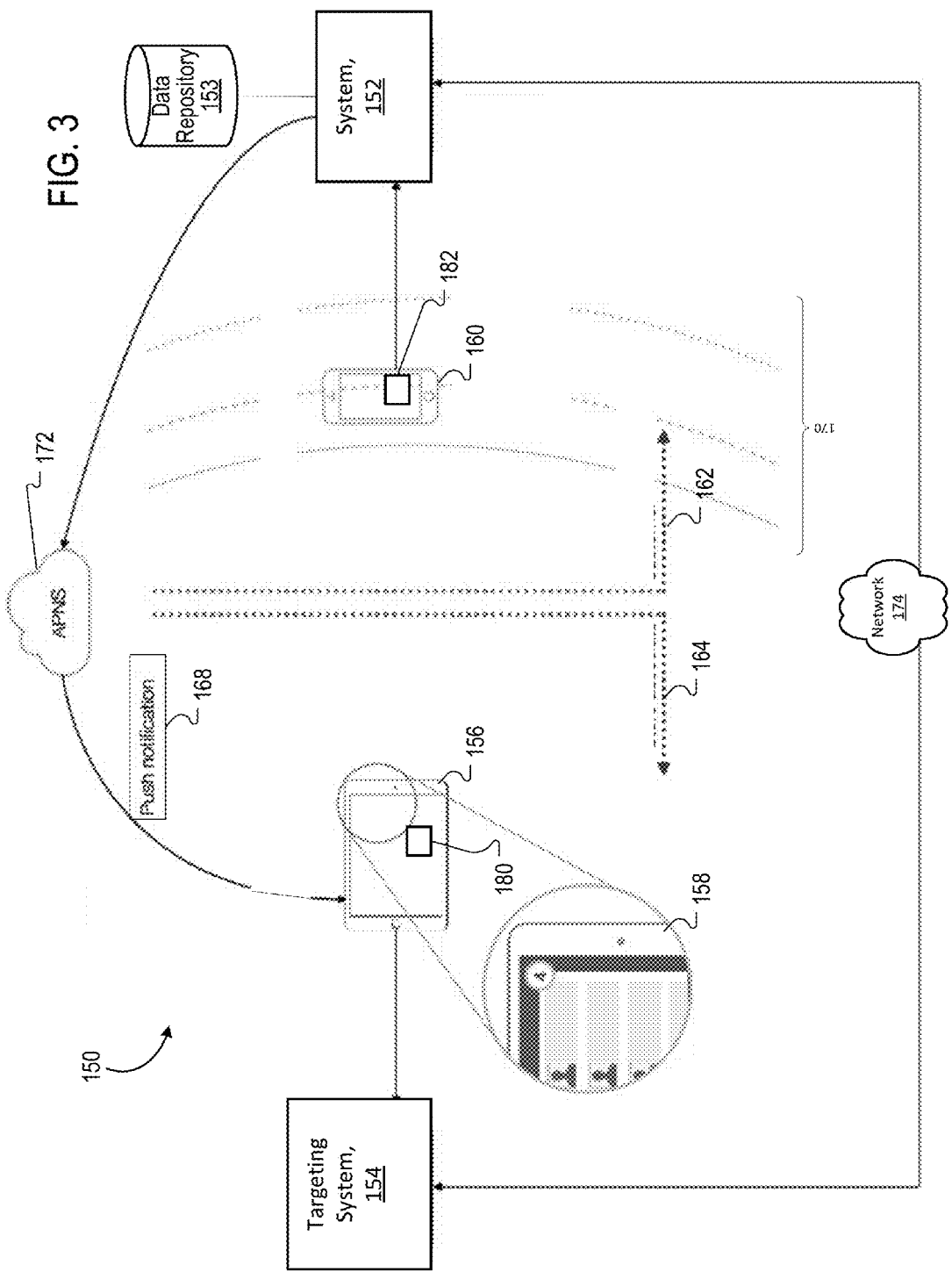
FIGS. 3-8 are diagrams of networked environments for performing mobile customer presence detection.

Referring to FIG. 3, networked environment 150 includes system 152 for mobile customer presence detection, e.g., detecting a presence of a customer (with a mobile device) at a specified location (e.g., a retail store). Networked environment 150 also includes client device 160 that is associated with a user (not shown), e.g., a user who enters a retail location. Networked environment 150 includes geo-fence 170. Generally, a geo-fence is a virtual perimeter for a real-world geographic area. Networked environment 150 includes network 174 through which the various computing systems and devices communicate with each other and/or access various services, such as service 172. In this example, service 172 is a cloud-computing service and is an Apple Push Notification service (APNs) to implement push notifications. Networked environment 150 also includes client device 156, e.g., that is used by a retail associate in a retail store. In an example, client device 156 displays a customer report, e.g., the customer report shown in graphical user interface 100 (FIG. 1). Networked environment 150 includes targeting system 154 for querying various data repositories and/or systems for customer information that can be used to target different types of transactions to customers and to promote customer purchases. In this example, targeting system 154 and system 152 are both located in the cloud. In a variation, targeting system 154 and system 152 are combined into a single system.

Networked environment 150 includes geographic regions 162, 164. In this example, both of geographic regions 162, 164 are located within a larger geographic region (e.g., a retail store). Each of geographic regions 162, 164 specify a particular portion of the larger geographic region. For example, geographic region 162 is a portion of the retail store that is associated with the customer and includes geo-fence 170. For example, geographic region 162 is associated with the entrance to the store, e.g., where customers walk into the store. In this example, geographic region 164 is associated with a store associate and includes client device 156 that is used by the store associate.

In this example, client device 160 executes application 182 that is associated with a specific entity (e.g., a retailer). Through the application 182, a user may view merchandise of the retailer and other information pertaining to the retailer. In this example, the user associated with client device 160 enters the store and crosses geo-fence 170. Client device 160 is a location-aware device. When client device 160 enters geo-fence 170, client device 160 receives a generated notification, e.g., from a cloud-based service that generates and transmits notification messages upon detection of crossing of a geo-fence. This notification includes information about the location of client device 160. In this example, the application 182 running on client device 160 executes a global positioning system (GPS) service (and/or is in communication with the GPS service) to track the location of client device 160 and to transmit to the cloud based service information indicative of the location of client device 160. In a variation, the application 182 is configured to detect when client device 160 crosses a geo-fence, e.g., using the GPS data. In still another variation, geo-fence detection is performed by system 152 and client device 160. In this example, system 152 is configured with the location of geo-fence 170. Using the GPS, client device 160 transmits to system 152 information indicative of the location of client device 160. Using the received location information, system 152 determines when client device 160 crosses geo-fence 170.

In the example of FIG. 3, upon client device 160 crossing geo-fence 170, the application 182 executing on client device 160 transmits a notification message to system 152. The notification message specifies that client device 160 has crossed geo-fence 170. In response, system 152 updates in data repository 153 information indicative of a list of customers at a current store with information that identifies the customer associated with client device 160. In a variation, each geographic location is associated with a geographic unique identifier (e.g., a store ID). In this example, system 152 stores in data repository 153 information that identifies the customer associated with client device 160 in association with the unique identifier of the geographic location that is associated with geo-fence 170. Through this association, system 152 can later query data repository 153 for a list of customers who are associated with a particular geographic unique identifier.

System 152 also sends a message (e.g., push notification 168) through service 172 and over network 174 to the corresponding retail application 180, e.g., an application executing on client device 156 that is associated with the retailer. Push notification 168 includes information specifying one or more customers that crossed geo-fence 170, e.g., the user associated with client device 160. Client device 156 receives push notification 168. In response, the application 180 running on client device 156 refreshes a list of customers who are currently in the geographic location, e.g., in the store. This refreshed list of customers is displayed in customer report 158, e.g., in portion 120 of graphical user interface 100 (FIG. 1).

In the example of FIG. 3, client device 156 also periodically updates the customer list displayed in customer report 158 through targeting system 154, triggered by receipt of push notification 168, which in turn is triggered by client device 160 crossing geo-fence 170. In this example, targeting system 154 includes a mobile stack, e.g., a combined configuration of a mobile server and an intelligence server. In this example, targeting system 154 is a source of the customer data and is a deployment which runs analytical reports on top the retailers' warehouse, which includes customer data. Targeting system 154 is also able to query data from system 152 to obtain a list of customers currently in the store and other data points that may not be in the data warehouse. In this example, targeting system 154 queries (over network 174) system 152 for a list of current customers at a specific geographic location (e.g., at a specific store). The query includes information that specifies a geographic unique identifier of the retail store. In response, system 152 queries data repository 153 for a list of customers who are currently at the geographic location (e.g., the retail store), e.g., by retrieving from data repository information indicative of customers associated with the geographic unique identifier of the store. System 152 sends this list to targeting system 154, which in turn transmits the list to client device 156 to display through application 180. In a variation, system 152 sends the list directly to client device 156 for display through application 180.

In this example, when a customer leaves the store, client device 160 re-crosses geo-fence 170, which causes client device 160 to receive another notification (of the crossing of the geo-fence). Client device 160 sends this other notification to system 152. The contents of this notification include a unique identifier for the customer associated with client device 160 and/or for client device 160 and information specifying that client device 160 has crossed geo-fence 170. Using contents of this notification, system 152 determines that the user has left the store and updates data repository 153 to reflect that the user has left the store. For example, system 152 updates the data repository 153 by deleting the unique identifier of the customer that is stored in association with the geographic unique identifier.

Figure 4:
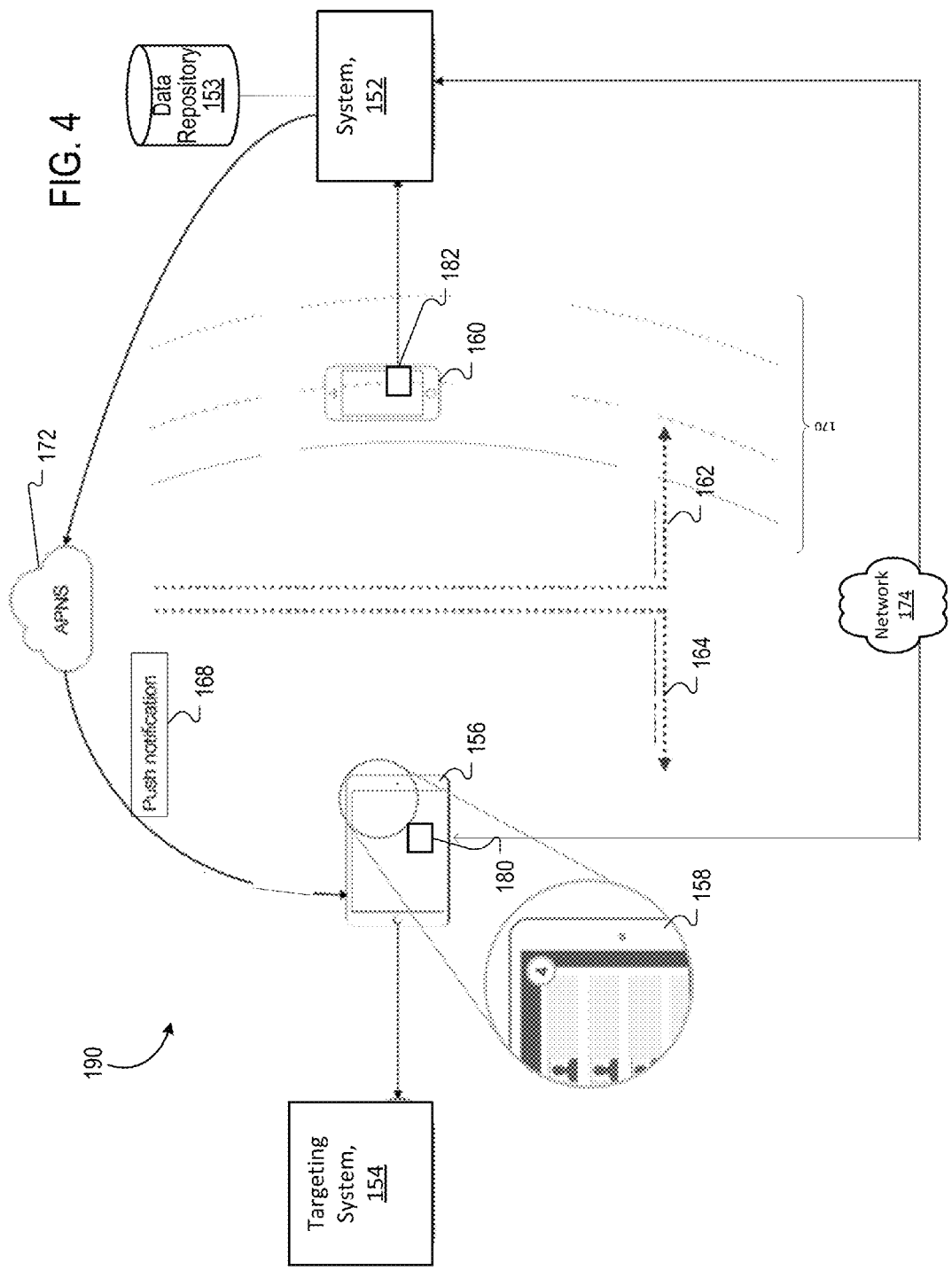

Referring to FIG. 4, networked environment 190 is a variation of networked environment 150. Networked environment 190 is also push notification driven. However, in this variation, the updated customer list is received by application 180 executing on client device 156 directly from system 152, which is triggered by client device 160 crossing geo-fence 170.

Figure 5:
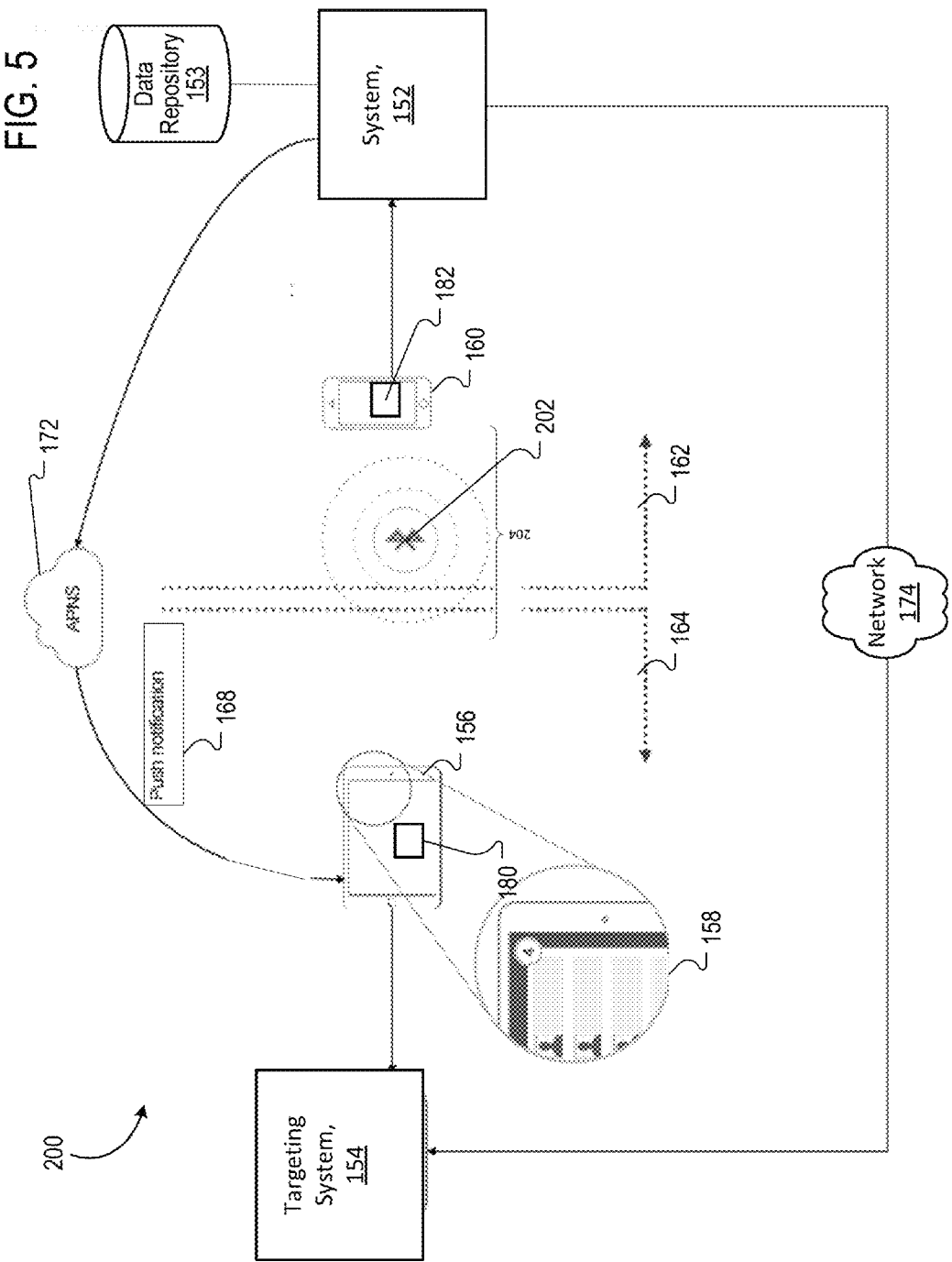

Referring to FIG. 5, networked environment 200 is a variation of networked environment 150. In networked environment 200, mobile customer presence detection is still message driven (e.g., driven by a push notification). As previously described in FIG. 3, a customer list is updated through targeting system 154 which is triggered by receipt of a push notification. In this example, the notification is initiated by application 160 detecting proximity to a store-side beacon.

In this example, networked environment 200 includes beacon 202 (e.g., a Bluetooth® beacon). Beacon 202 has a communication range 204 for transmission of signals. Application 182 detects proximity to beacon 202, e.g., by receiving one or more signals emitted from beacon 202 when client device 160 enters communication range 204. Upon detecting that client device 160 is in proximity to beacon 202, client device 160 transmits to system 152 a notification message that includes information identifying beacon 202 and client device 160. Using contents of the notification message, system 152 determines that client device 160 has entered a particular geographic location (e.g., a particular retail store). In response, system 152 initiates the sending of push notification 168, e.g., to cause the customer list to be updated—as previously described.

In this example, data repository 153 stores information that specifies associations between variation geographic locations (e.g., retail store) and beacon identifiers. Based on these associations and the beacon identifier included in the message received from client device 160, system 152 determines which geographic location is associated with the beacon identifier specified in the notification message. In this example, the information specifying the various geographic locations is stored in association with contact information for the various geographic locations (e.g., email addresses, IP addresses and so forth). Using this contact information, system 152 pushes push notification 168 to client device 156.

Figure 6:
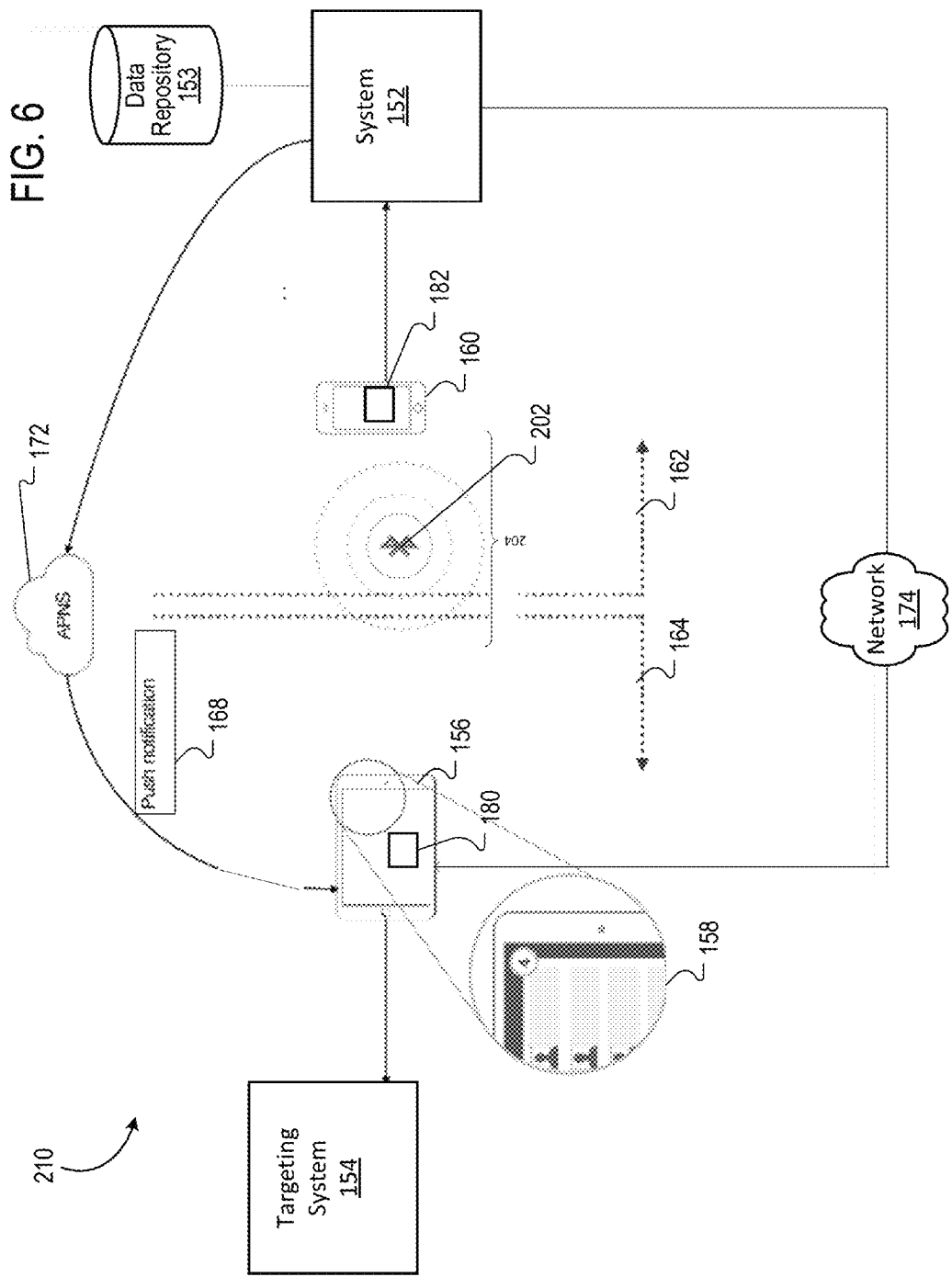

Referring to FIG. 6, networked environment 210 is a variation of networked environment 200. Networked environment 210 is also push notification driven. However, in this variation, the updated customer list is received by application 180 executing on client device 156 directly from system 152, which is triggered by application 182 detecting proximity to in-store beacon 204.

Figure 7:
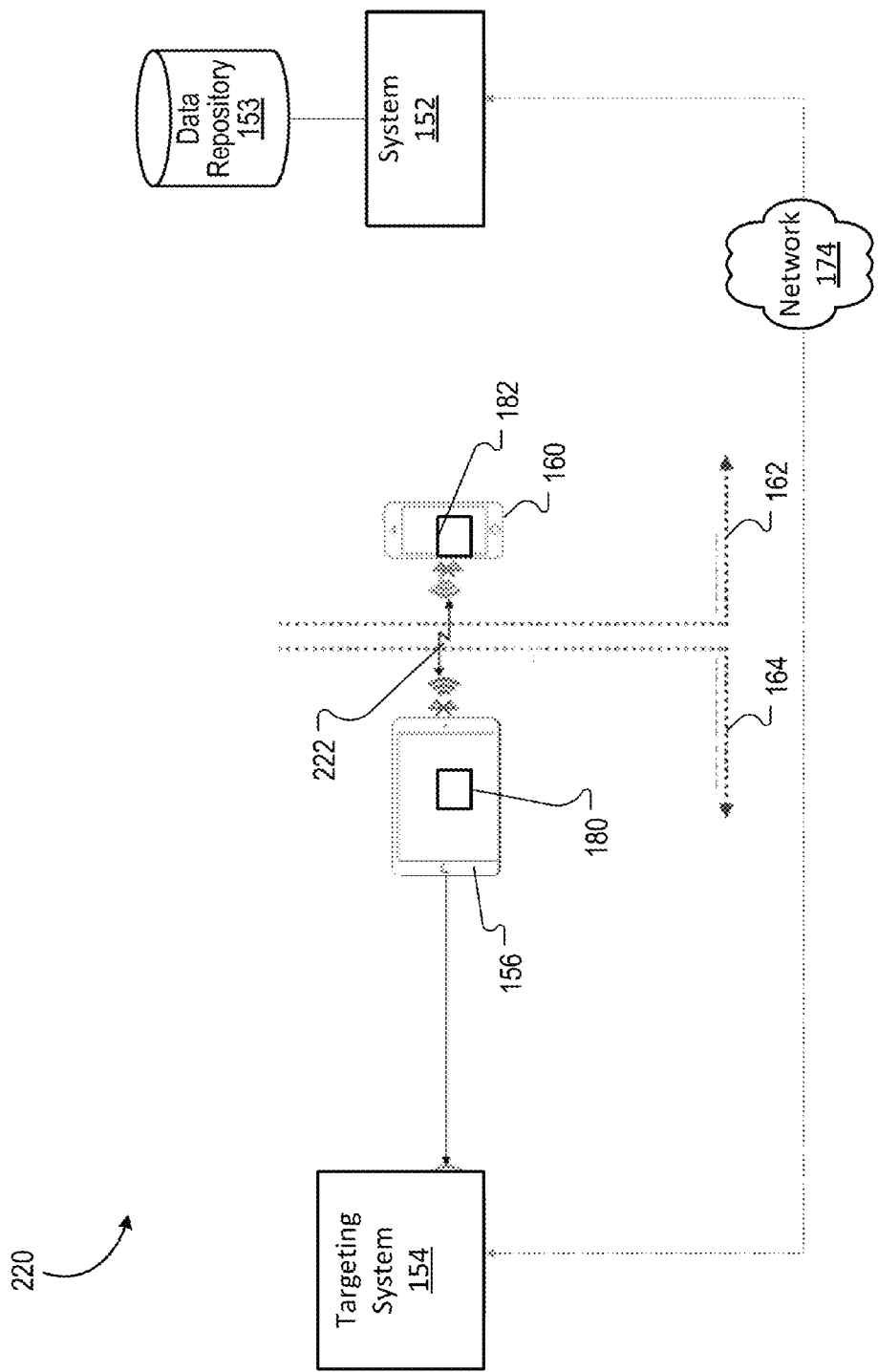

Referring to FIG. 7, networked environment 220 performs mobile customer presence detection by direct device communication. In networked environment 220, the customer list is updated locally, by tracking near-by devices that have an application associated with a specific geographic location (e.g., application 182 for a retailer). Customer details are then retrieved through targeting system 154.

In the example of FIG. 7, application 182 on client device 160 detects proximity to application 180 on client device 156. In this example, client device 156 includes a beacon (not shown) that transmits signals that can be received by a receiver (not shown) in client device 160. Both of client devices 156, 160 are configured with a wireless technology standard for exchanging data over short distances (using short-wavelength UHF radio waves in the ISM band from 2.4 to 2.485 GHz[2]) from fixed and mobile devices (e.g., Bluetooth® enabled). Client devices 156, 160 establish wireless communication channel 222 with each other. For example, application 182 detects proximity to store application beacon (not shown) and initiates direction communication with the application 180 (through the beacon) to register itself to a local registry on client device 156. Through the wireless communication channel 222, client device 160 detects that it is in proximity to client device 180. Following detection, application 182 initiates direct communication with application 180 to register itself to a local registry of client device 156. For example, application 180 receives, from application 182, a request to register as "currently in the store." Application 182 (e.g., the consumer application) transmits to application 180 (e.g., the store application) the customer ID, e.g., of the user who is logged into application 182. In an example, application 182 stores on client device 160 the customer ID. In another example, when a user log into application 182, client device 160 transmits the login information to system 152, which in turn transmits the customer ID (that is associated with the login information) to client device 160.

Using the customer ID, application 180 (e.g., the store application) retrieves data about the customer, including, e.g., user details, historical transaction information and so forth. There are various ways in which application 180 retrieves the customer data. In an example, application 180 transmits the customer ID to targeting system 154, which in turn retrieves the customer data from a data repository. In another example, application 180 transmits the customer ID to system 152 with a request for customer data that is associated with the transmitted customer ID. In response, system 152 retrieves from data repository 153 customer data that is associated with the transmitted customer ID and transmits the retrieved customer data to client device 156 for display through application 180.

In the example of FIG. 7, customer application 182 does not need a network connection to communicate with client device 156, and therefore this type of direct device communication is more appropriate for locations with low mobile network availability. In this example, the store associate application (e.g., application 180) cannot detect client device 160, unless client device 160 is within the reach of the Bluetooth® range of client device 156.

Figure 8:
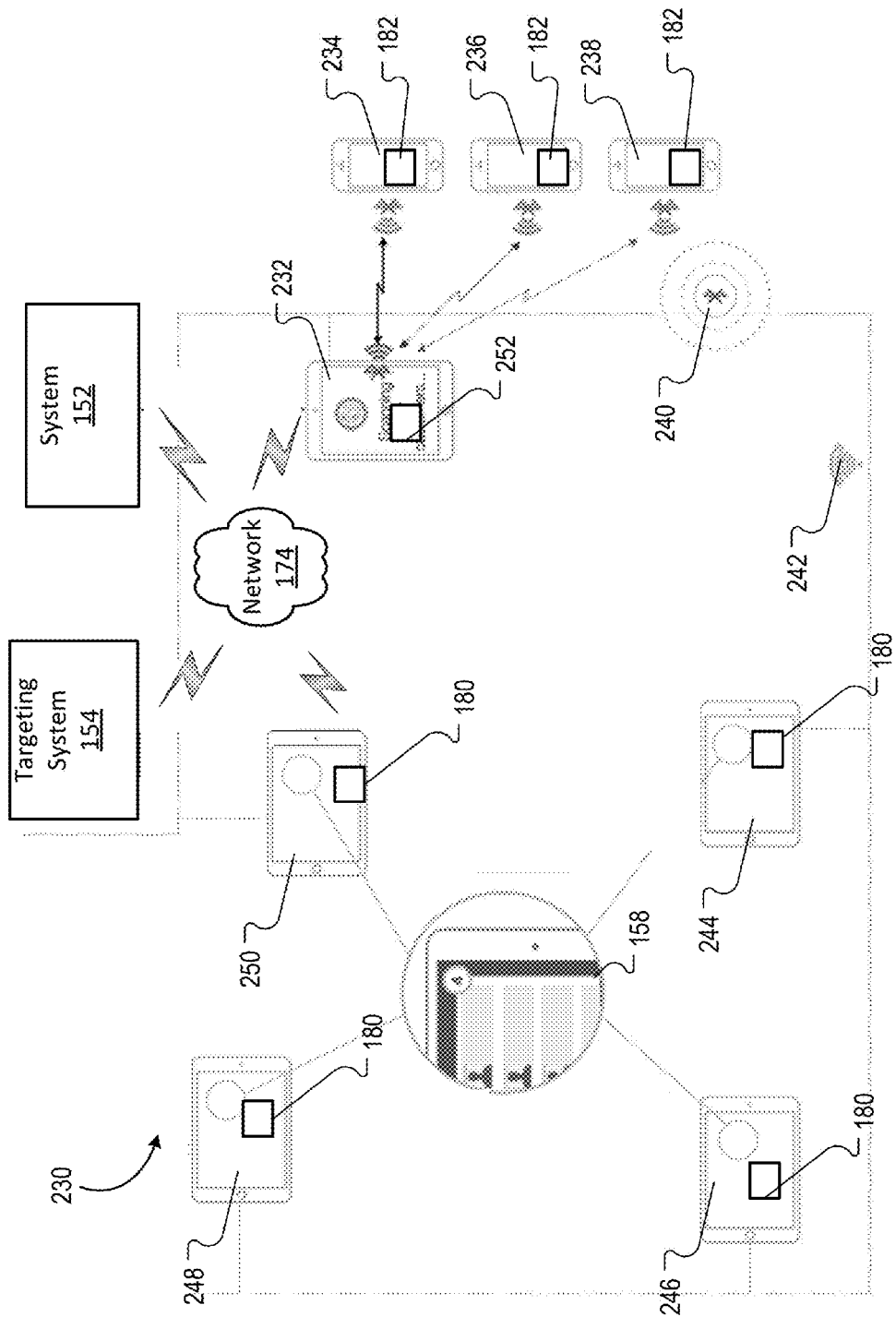

Referring to FIG. 8, networked environment 230 performs mobile customer presence detection through direct device communication. Networked environment 230 includes client devices 234, 236, 238, each of which is implementing application 182 (e.g. a customer application). In this example, client devices 234, 236, 238 are each associated with a customer who has entered a specific geographic location, e.g., a retail store. Networked environment 230 also includes client devices 244, 246, 248, 250 that are associated with and used by retail associates. Each of client devices 244, 246, 248, 250 executes application 180 (e.g., a retail store associate application).

As previously described, applications 180, 182 are associated with a particular merchant (e.g., a retailer). Application 180 is the retailer version of the application. Application 182 is the customer version of the application. Through application 182, the customer can receive offers and other information that is specific to the retailer. Through application 180, a retail associate can view a listing of customers who are presently in the store. Networked environment 230 also includes beacon 240 (e.g., a store Bluetooth® beacon) and network 242 (e.g., a store Wi-Fi network). Networked environment 230 also includes client device 232 with application 252, which is a store-side application that is dedicated to scanning for nearby devices with the consumer application (e.g., application 182).

In this example, as customers walk into a specified geographic location (e.g., a retail store), client device 232 (e.g., a dedicated iPad) scans devices (e.g., client devices 234, 236, 238) broadcasting their customer IDs. In an example, client device 232 establishes a connection to one or more of client devices 234, 236, 238 through beacon 240. When a customer is detected by client device 232, client device 232 adds to a local customer registry (e.g., on client device 232) information representing the customer (e.g., the customer ID). For example, when client device 234 is executing customer application 182, customer application 182 broadcasts a customer ID that uniquely represents the customer associated with client device 234. In this example, system 152 assigns customer IDs to customers, e.g., when the customer downloads application 182 or otherwise logs into application 182.

Following updating the local registry with customer IDs (that represent customers who are in the store), application 252 (e.g., the dedicated scanning application) may retrieve additional customer details by querying system 152 for customer data associated with the various customer IDs. In this example, customer applications 182 do not need a network connection to enable detection by application 252. Therefore, this type of direct device communication is more appropriate for locations with low mobile network availability. In this example, sales associates can detect customers, even when those customers are not within close proximity to the sale associates and to client devices 244, 246, 248, 250. In a variation of FIG. 8, a retail store may have multiple dedicated client devices that are scanning for customers, e.g., to increase coverage.

After the dedicated client device 252 updates a customer list locally, by tracking near-by devices that have the customer application, the local list of customers is then synchronized to all store devices via the local WiFi network 242. Customer details are retrieved via targeting system 154. For example, the instances of the store associate application (e.g., application 180 executing on client devices 244, 246, 248, 250)

receive a copy of the local customer registry from client device 232. The copy on client devices 244, 246, 248, 250 gets updated periodically (e.g., automatically and instantly) as client device 232 broadcasts events that signal customers entering or leaving the store. Through application 180, client devices 244, 246, 248, 250 render a customer report 158 that shows updated lists of customers who are users of application 182 and who are presently in the store. Using the customer IDs collected in the local customer registry, store application 180 can fetch (from targeting system 154 and/or from system 152) data about the customers, e.g., user details, historical transaction information, and so forth. For example, this data may be fetched via the targeting system 154 from a data repository. In another example, this data is fetched from system 152, e.g., by executing queries against system 152.

Figure 9:
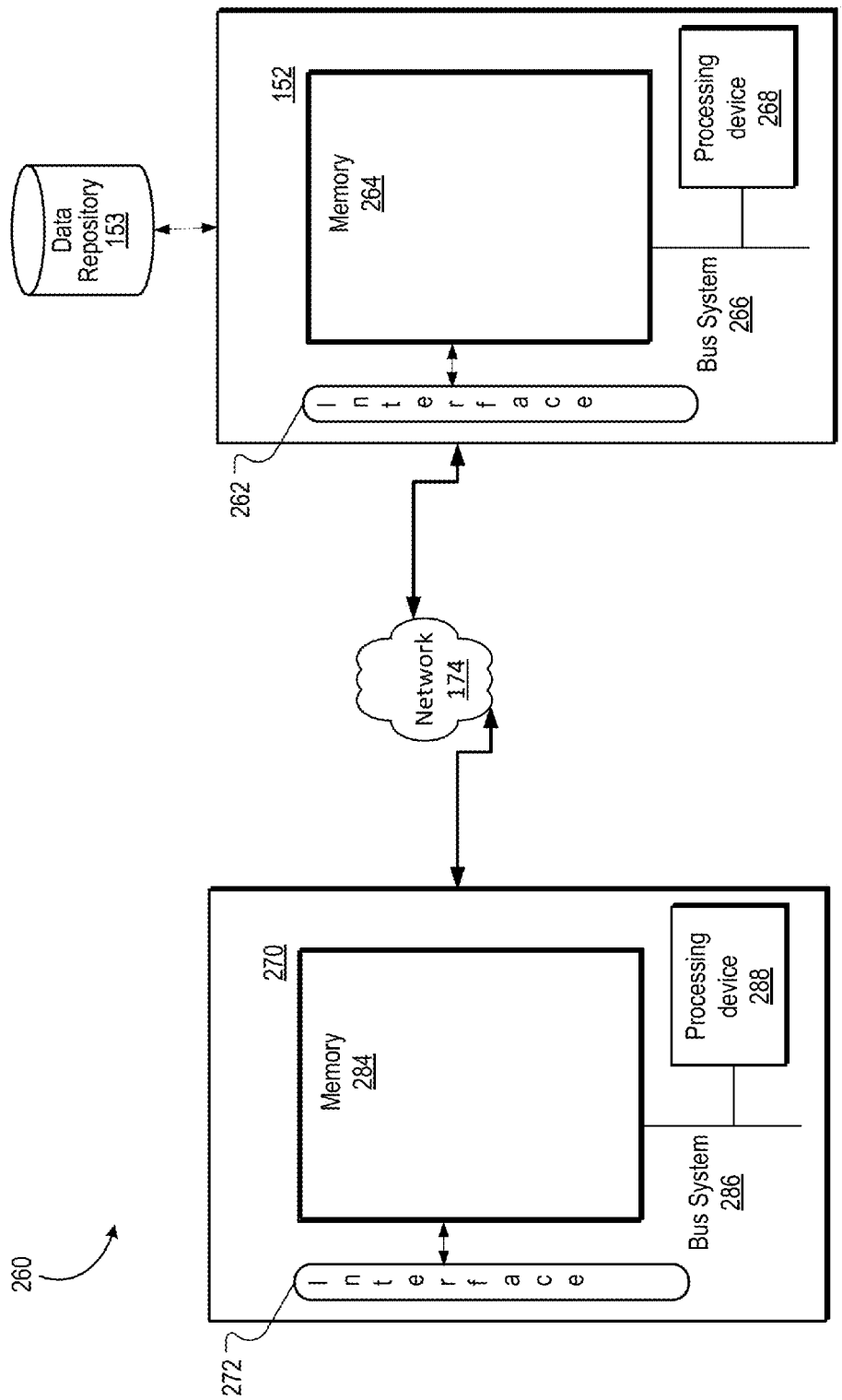
FIG. 9 is a diagram of components of a networked environment for performing mobile customer presence detection.

Referring to FIG. 9, networked environment 260 is shown for implementing the techniques described herein. Examples of networked environment 260 include any of the previously described networked environments. Client device 270 can be any sort of computing device capable of taking input from a user and communicating over network 174 with system 152 and/or with other client devices. Client device 270 can be one or more of the previously described client devices. For example, client device 270 can be one or more mobile devices, one or more desktop computers, one or more laptops, one or more cell phones, one or more personal digital assistants ("PDAs"), one or more iPhones, one or more smart phones, one or more iPads, one or more servers, one or more embedded computing systems, and so forth.

Client device 270 also includes memory 284, a bus system 286, and a processor 288. Memory 284 can include a hard drive and a random access memory storage device, such as a dynamic random access memory, machine-readable media, machine-readable hardware storage devices, or other types of non-transitory machine-readable storage devices. Memory 284 stores various computer programs, e.g., a customer application, a retail store application, a scanning application, and so forth. A bus system 286, including, for example, a data bus and a motherboard, can be used to establish and to control data communication between the components of client device 270. Processor 288 may include one or more microprocessors and/or processing devices. Generally, processor 186 may include any appropriate processor and/or logic that are capable of receiving and storing data, and of communicating over a network (not shown). Client device 270 can receive data from system 152 via input/output ("I/O") interface 272. I/O interface 272 can be any type of interface capable of receiving data over a network, such as an Ethernet interface, a wireless networking interface, a fiber-optic networking interface, a modem, and so forth.

System 156 also includes memory 264, a bus system 266, and a processor 268. Memory 264 can include a hard drive and a random access memory storage device, such as a dynamic random access memory, machine-readable media, machine-readable hardware storage devices, or other types of non-transitory machine-readable storage devices. Memory 264 stores various computer programs. A bus system 266, including, for example, a data bus and a motherboard, can be used to establish and to control data communication between the components of system 166. Processor 268 may include one or more microprocessors and/or processing devices.

System 152 can be any of a variety of computing devices capable of receiving data, such as a server, a distributed computing system, a desktop computer, a laptop, a cell phone, a rack-mounted server, cloud computing device, and so forth. System 152 may be a single server or a group of servers that are at a same location or at different locations. System 152 can receive data from client devices (e.g., client device 270) via input/output ("I/O") interface 262. I/O interface 262 can be any type of interface capable of receiving data over a network, such as an Ethernet interface, a wireless networking interface, a fiber-optic networking interface, a modem, and so forth.

Figure 10:
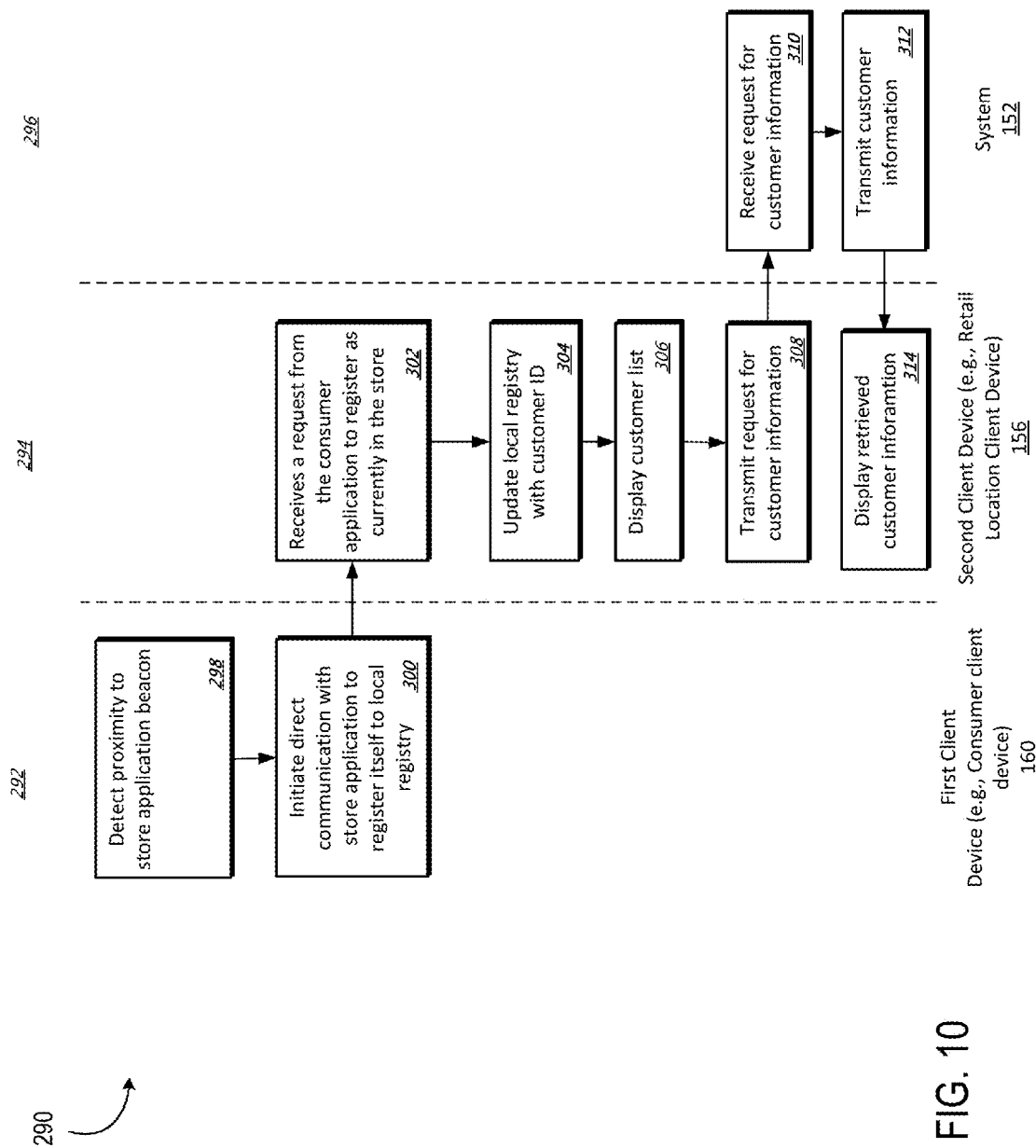

Referring to FIG. 10, process 290 is performed in mobile customer presence detection. Process 290 includes part 292, which is implemented by client device 160 (e.g., a consumer client device), part 294, which is implemented by client device 156 (e.g., a retail location client device) and part 296, which is implemented by system 152.

In operation, client device 160 detects (298) that it is in proximity to a store application beacon, e.g., on client device 156. In this example, client device 156 is enabled with a communication standard (e.g., Bluetooth®) that enables a transmitter in client device 156 to act as a beacon. In this example, client device 156 includes an application (e.g., a store or retail version of an application) and client device 160 also includes a version of the application (e.g., a consumer version of the application). Through the beacon, client device 160 detects proximity to the application executing on client device 156.

Client device 160 initiates (300) a direction communication with the application executing on client device 156 to register client device 160 to a local registry on client device 156. In response, client device 156 (and/or the application executing on client device 156) receives (302), from the consumer application (e.g., the application executing on client device 160), a request to register client device 160 as being located in a particular geographic location (e.g., in a store). In this example, the application on client device 160 is a particular version of the application that is formatted for a consumer. The application on client device 156 is another, different version of the application that is designed for an employee (e.g., a sales associate). In this example, the request includes a customer identifier (ID) that uniquely identifies the user of client device 160. For example, the customer ID has been assigned (e.g., by system 152) to the application that is executing on client device 160.

In response to the request, client device 156 updates (304) a local registry with the customer ID, e.g., to indicate that the customer is currently located in the particular geographic location—in a retail store. Using contents of the local registry, client device 156 displays (306) an updated customer list with names (and/or other identifying information) of the customers who are presently in a particular geographic location. For a particular customer (and/or a particular group of customers), client device 156 transmits (308) to system 152 a request for customer information. In an example, the request is for information about a particular customer that is selected by a user of client device 156 (e.g., a store associate). In this example, the request includes the customer IDs of the customers for which information is requested. In response, system 152 receives (310) the request for customer information and retrieves, from a data repository, the customer information that is associated with the customer IDs included in the request. System 152 transmits (312) the retrieved customer information to client device 156. In turn, client device 156 displays (314) the customer information, e.g., in a graphical user interface. In a variation, actions 310, 312 are performed by system 154.

Referring to FIG. 11, process 320 is performed in using direct communications in performing mobile customer presence detection. Process 320 includes portion 322, which is performed by client device 160 (and/or a version of an application that is running on client device 160). Process 320 also includes portion 324, which is implemented by client device 232 (and/or a version of an application that is running on client device 232). Process 320 also includes portion 326, which is implemented by client device 156 (and/or a version of the application that is running on client device 156). Process 320 also includes portion 328, which is implemented by system 152. In this example, system 152 generates the various versions of the applications that are implemented by the various client devices.

In operation, client device 160 broadcasts (330) signals. Client device 232 scans (332) for devices that are in a communication range of client device 232 (e.g., that are in proximity to client device 232). In an example, client device 232 detects that client device 160 is transmitting signals that indicate that client device 160 is in proximity to client device 232. Based on the transmitted signals, client device 232 detects that client device 160 is executing the consumer version of the application. In this example, consumer application broadcasts a message (e.g., via Bluetooth®) that identifies itself as the consumer version of the application (and/or the mobile platform) along with an identifier (ID) that is associated with the customer logged into the application.

When client device 232 detects that another client device is in its proximity, client device 232 requests a customer ID from the other client device (e.g., a customer ID associated with the application that is executing on client device 160). Client device 232 updates (334) its local registry with the customer ID, e.g., to indicate that the customer associated with the customer ID is presently in the geographic location. Client device 232 broadcasts (335) its local registry to other client devices, e.g., client device 156. In response, client device 156 receives (336) the broadcast of the local registry. Using contents of the local registry, client device 156 displays (338) a current customer list.

For a particular customer (and/or a particular group of customers), client device 156 transmits (340) to system 152 a request for customer information. In an example, the request is for information about a particular customer that is selected by a user of client device 156 (e.g., a store associate). In this example, the request includes the customer IDs of the customers for which information is requested. In response, system 152 receives (344) the request for customer information and retrieves, from a data repository, the customer information that is associated with the customer IDs included in the request. System 152 transmits (346) the retrieved customer information to client device 156. In turn, client device 156 displays (348) the customer information, e.g., in a graphical user interface. In a variation, actions 344, 346 are performed by system 154.

Embodiments can be implemented in digital electronic circuitry, or in computer hardware, firmware, software, or in combinations thereof. Apparatus of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:

1. A computer-implemented method comprising:
   automatically tracking, by a first client device, one or more second client devices implementing an application that is associated with a particular geographic location in which the first client device is physically located, the tracking based on receipt of global positioning system (GPS) data received from the one or more second client devices;
   wherein the first client device is programmed with a geo-fence for the particular geographic location;
   detecting, based on the received GPS data by the first client device in the particular geographic location, that a second client device, which is implementing the application associated with the particular geographic location in which the first client device is physically located, is within the geo-fence for the particular geographic location;
   based on detecting, identifying a presence of a mobile customer in the particular geographic location, with detecting being through a direct device communication between the first client device and a second client device that is associated with the mobile customer;
   in response to the mobile customer presence detection, updating a local registry of the first client device with a customer identifier of the mobile customer;
   retrieving, from a server device, customer information about the mobile customer;
   generating, based on contents of the local registry, a list of customers who are presently located in the particular geographic location; and
   rendering on a display device of the first client device at least one of the list of customers or the retrieved customer information.

2. The computer-implemented method of claim 1, wherein a first version of the application is executing on the first client device, wherein a different, second version of the application is executing on the second client device, and wherein detecting comprises:
   receiving, from the second version of the second application that is executing on the second client device through the direct device communication by the first version of the application that is executing on the first client device, a request to locally register the mobile customer in the local registry of the first client device as being presently located in a particular geographic location, wherein the first client device is located in the same geographic location, wherein the request is received from the second client device that is executing the second version of the application, and wherein the request comprises a customer identifier that uniquely identifies the mobile customer.

3. The computer-implemented method of claim 2,
wherein the application is an application for promoting transactions with a particular retailer;
wherein the first version of the application is a retail sales associate version of the application;
wherein the second version of the application is a customer version of the application;
wherein the particular geographic location comprises a retail store;
wherein the first client device comprises a client device that is used by a retail sales associate; and
wherein the second client device comprises a client device that is used by the consumer.

4. The computer-implemented method of claim 2, further comprising:
generating information for a graphical user interface that when rendered on the first client device through the first version of the application displays:
the list of customers who are presently located in the particular geographic location.

5. The computer-implemented method of claim 2, further comprising:
rendering, on a display device of the first client device, the list of customers who are presently located in the particular geographic location;
receiving information indicative of a selection of one of the customers in the list;
retrieving, from a server device, customer information about the selected customer; and
in response to the selection, displaying the retrieved customer information about the selected customer.

6. A computer-implemented method comprising:
periodically broadcasting, by a beacon in a first client device executing a first version of an application, signals directed only to a different, second version of the same application;
responsive to the broadcasting, automatically detecting, by the first version of the application that is executing on the first client device, a second client device executing the different, second version of the same application that is within a communication range of the first client device, with detecting being through a direct device communication that is independent of network connectivity between the first version of the application on the first client device and the second version of the same application on the second client device;
based on the detecting, identifying a presence of a mobile customer in a particular geographic location in proximity to the first client device, with the mobile customer being associated with the second client device;
in response to the mobile customer presence detection, updating a local registry of the first client device with a customer identifier of the mobile customer;
synchronizing one or more third client devices executing a third version of the same application that is on the first and second client devices with the updated, local registry by broadcasting to one or more third client devices in the particular geographic location the updated local registry; and
automatically causing the third version of the same application that is executing on the one or more third client devices to render a graphical user interface with a real-time list of customers who are presently in the particular geographic location in accordance with the updated local registry, with the graphical user interface enabling connection to a remote system over the Internet based on user interaction with one or more selectable portions of the graphical user interface and when a third client device rendering the graphical user interface is online.

7. The computer-implemented method of claim 6;
wherein the first version of the application is a store-side application that is dedicated to scanning for nearby devices that execute the second version of the application;
wherein the second version of the application is a consumer version of the application;
wherein the third version of the application is a store associate version of the application.

8. The computer-implemented method of claim 6, further comprising:
retrieving, from a server device, customer information about the detected mobile customer; and
transmitting to at least one of the one or more third client devices the retrieved customer information for display on the at least one of the one or more third client devices.

9. An electronic system comprising:
one or more processing devices; and
one or more machine-readable hardware storage devices storing instructions that are executable by the one or more processing devices to perform operations comprising:
automatically tracking, by a first client device, one or more second client devices implementing an application that is associated with a particular geographic location in which the first client device is physically located, the tracking based on receipt of global positioning system (GPS) data received from the one or more second client devices;
wherein the first client device is programmed with a geo-fence for the particular geographic location;
detecting, based on the received GPS data by the first client device in the particular geographic location, that a second client device, which is implementing the application associated with the particular geographic location in which the first client device is physically located, is within the geo-fence for the particular geographic location;
based on detecting, identifying a presence of a mobile customer in the particular geographic location, with detecting being through a direct device communication between the first client device and a second client device that is associated with the mobile customer;
in response to the mobile customer presence detection, updating a local registry of the first client device with a customer identifier of the mobile customer;
retrieving, from a server device, customer information about the mobile customer;
generating, based on contents of the local registry, a list of customers who are presently located in the particular geographic location; and
rendering on a display device of the first client device at least one of the list of customers or the retrieved customer information.

10. The electronic system of claim 9, wherein a first version of the application is executing on the first client device, wherein a different, second version of the application is executing on the second client device, and wherein detecting comprises:
  receiving, from the second version of the second application that is executing on the second client device through the direct device communication by the first version of the application that is executing on the first client device, a request to locally register the mobile customer in the local registry of the first client device as being presently located in a particular geographic location, wherein the first client device is located in the same geographic location, wherein the request is received from the second client device that is executing the second version of the application, and wherein the request comprises a customer identifier that uniquely identifies the mobile customer.

11. The electronic system of claim 10,
  wherein the application is an application for promoting transactions with a particular retailer;
  wherein the first version of the application is a retail sales associate version of the application;
  wherein the second version of the application is a customer version of the application;
  wherein the particular geographic location comprises a retail store;
  wherein the first client device comprises a client device that is used by a retail sales associate; and
  wherein the second client device comprises a client device that is used by the consumer.

12. The electronic system of claim 10, wherein the operations further comprise:
  generating information for a graphical user interface that when rendered on the first client device through the first version of the application displays:
  the list of customers who are presently located in the particular geographic location.

13. The electronic system of claim 10, wherein the operations further comprise:
  rendering, on a display device of the first client device, the list of customers who are presently located in the particular geographic location;
  receiving information indicative of a selection of one of the customers in the list;
  retrieving, from a server device, customer information about the selected customer; and
  in response to the selection, displaying the retrieved customer information about the selected customer.

14. The electronic system of claim 10, wherein the first client device is the electronic system and wherein the first client device comprises the one or more processing devices.

15. One or more machine-readable hardware storage devices storing instructions that are executable by one or more processing devices of a first client device to perform operations comprising:
  periodically broadcasting, by a beacon in the first client device executing a first version of an application, signals directed only to a different, second version of the same application;
  responsive to the broadcasting, automatically detecting, by the first version of the application that is executing on the first client device, a second client device executing the different, second version of the same application that is within a communication range of the first client device, with detecting being through a direct device communication that is independent of network connectivity between the first version of the application on the first client device and the second version of the same application on the second client device;
  based on the detecting, identifying a presence of a mobile customer in a particular geographic location in proximity to the first client device, with the mobile customer being associated with the second client device;
  in response to the mobile customer presence detection, updating a local registry of the first client device with a customer identifier of the mobile customer;
  synchronizing one or more third client devices executing a third version of the same application that is on the first and second client devices with the updated, local registry by broadcasting to one or more third client devices in the particular geographic location the updated local registry; and
  automatically causing the third version of the same application that is executing on the one or more third client devices to render a graphical user interface with a real-time list of customers who are presently in the particular geographic location in accordance with the updated local registry, with the graphical user interface enabling connection to a remote system over the Internet based on user interaction with one or more selectable portions of the graphical user interface and when a third client device rendering the graphical user interface is online.

16. The one or more machine-readable hardware storage devices of claim 15,
  wherein the first version of the application is a store-side application that is dedicated to scanning for nearby devices that execute the second version of the application;
  wherein the second version of the application is a consumer version of the application; and
  wherein the third version of the application is a store associate version of the application.

17. The one or more machine-readable hardware storage devices of claim 15, wherein the operations further comprise:
  retrieving, from a server device, customer information about the detected mobile customer; and
  transmitting to at least one of the one or more third client devices the retrieved customer information for display on the at least one of the one or more third client devices.

18. One or more machine-readable hardware storage devices storing instructions that are executable by one or more processing devices of a first client device to perform operations comprising:
  automatically tracking, by the first client device, one or more second client devices implementing an application that is associated with a particular geographic location in which the first client device is physically located, the tracking based on receipt of global positioning system (GPS) data received from the one or more second client devices;
  wherein the first client device is programmed with a geo-fence for the particular geographic location;
  detecting, based on the received GPS data by the first client device in the particular geographic location, that a second client device, which is implementing the application associated with the particular geographic location in which the first client device is physically located, is within the geo-fence for the particular geographic location;
  based on detecting, identifying a presence of a mobile customer in the particular geographic location, with detecting being through a direct device communication between the first client device and a second client device that is associated with the mobile customer;

in response to the mobile customer presence detection, updating a local registry of the first client device with a customer identifier of the mobile customer;

retrieving, from a server device, customer information about the mobile customer;

generating, based on contents of the local registry, a list of customers who are presently located in the particular geographic location; and rendering on a display device of the first client device at least one of the list of customers or the retrieved customer information.

19. The one or more machine-readable hardware storage devices of claim 18, wherein a first version of the application is executing on the first client device, wherein a different, second version of the application is executing on the second client device, and wherein detecting comprises:

receiving, from the second version of the second application that is executing on the second client device through the direct device communication by the first version of the application that is executing on the first client device, a request to locally register the mobile customer in the local registry of the first client device as being presently located in a particular geographic location, wherein the first client device is located in the same geographic location, wherein the request is received from the second client device that is executing the second version of the application, and wherein the request comprises a customer identifier that uniquely identifies the mobile customer.

20. The one or more machine-readable hardware storage devices of claim 18, wherein the application is an application for promoting transactions with a particular retailer;

wherein the first version of the application is a retail sales associate version of the application;

wherein the second version of the application is a customer version of the application;

wherein the particular geographic location comprises a retail store;

wherein the first client device comprises a client device that is used by a retail sales associate; and wherein the second client device comprises a client device that is used by the consumer.

\* \* \* \* \*